United States Patent
Kim

(10) Patent No.: US 9,662,960 B2
(45) Date of Patent: May 30, 2017

(54) AVN TERMINAL, VEHICLE HAVING THE SAME AND METHOD OF CONTROLLING VEHICLE

(71) Applicant: HYUNDAI MOTOR COMPANY, Seoul (KR)

(72) Inventor: Jeong Hun Kim, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/828,200

(22) Filed: Aug. 17, 2015

(65) Prior Publication Data

US 2016/0159200 A1   Jun. 9, 2016

(30) Foreign Application Priority Data

Dec. 8, 2014   (KR) ........................ 10-2014-0175074

(51) Int. Cl.
*B60H 1/00* (2006.01)
*H04W 4/02* (2009.01)

(52) U.S. Cl.
CPC ..... *B60H 1/00971* (2013.01); *B60H 1/00742* (2013.01); *H04W 4/02* (2013.01)

(58) Field of Classification Search
CPC ..................... B60H 1/00971; B60H 1/00742
See application file for complete search history.

(56) References Cited

U.S. PATENT DOCUMENTS

2012/0142264 A1* 6/2012 Sagou ............... B60H 1/00735
454/75

FOREIGN PATENT DOCUMENTS

| JP | 7-25219 A | 1/1995 |
|---|---|---|
| JP | 2002-089927 A | 3/2002 |
| JP | 2003-248045 A | 9/2003 |
| JP | 2005-271773 A | 10/2005 |
| JP | 2010-516407 A | 5/2010 |
| KR | 1997-0020541 A | 5/2009 |

OTHER PUBLICATIONS

Korean Office Action dated Dec. 1, 2015 issued in Korean Patent Application No. 10-2014-0175074 (English translation).

* cited by examiner

*Primary Examiner* — Basil T Jos
(74) *Attorney, Agent, or Firm* — McDermott Will & Emery LLP

(57) ABSTRACT

An audio video navigation (AVN) terminal may include a communication unit configured to receive a signal from a user terminal; an extracting unit configured to extract location information of the user terminal based on the received signal; and a controller configured to control an air conditioning environment in the vehicle based on a user's biometric information included in the signal and location information of the user terminal.

26 Claims, 10 Drawing Sheets

AVN TERMINAL, VEHICLE HAVING THE SAME AND METHOD OF CONTROLLING VEHICLE

CROSS-REFERENCE TO RELATED APPLICATION

This application claims the benefit of Korean Patent Application No. 10-2014-0175074, filed on 8 Dec. 2014 in the Korean Intellectual Property Office, the disclosure of which is incorporated herein by reference.

BACKGROUND

1. Field

Embodiments of the present invention relate to an audio video navigation (AVN) terminal for controlling an air conditioning device, a vehicle having the same and a method of controlling a vehicle.

2. Description of the Related Art

Recent vehicles include an audio video navigation (AVN) terminal embedded therein. The AVN terminal may provide a route to a destination to a user and may display various control screens related to control of devices installed in the vehicle or a screen related to an additional function that can be executed in the AVN terminal. Accordingly, research on technology in which a user manipulates the AVN terminal through a display in which a touch screen is implemented, a controller in the form of a jog shuttle or the like and controls devices in the vehicle has been underway.

SUMMARY

The present invention provides an audio video navigation (AVN) terminal for controlling an air conditioning environment based on state information of passengers in a vehicle, the vehicle having the same and a method of controlling the vehicle.

According to an aspect of the present invention, there is provided an AVN terminal, including: a communication unit configured to receive a signal from a user terminal; an extracting unit configured to extract location information of the user terminal based on the received signal; and a controller configured to control an air conditioning environment in the vehicle based on a user's biometric information included in the signal and the extracted location information of the user terminal.

The extracting unit may calculate state information based on the received signal and extract the location information of the user terminal by combining direction information and distance information of the user terminal that are obtained based on the calculated state information.

The extracting unit may calculate state information including radiation pattern information of the user terminal and a received signal strength indication based on the received signal.

The extracting unit may obtain the direction information of the user terminal using identification information and radiation pattern information of the user terminal.

The extracting unit may obtain the distance information of the user terminal using the received signal strength indication of the user terminal.

The AVN terminal may further include an input unit configured to receive a control command related to an air conditioning device from a user in response to control of the air conditioning environment in the vehicle; and a generating unit configured to collect a control command that is related to an air conditioning device and input by the user and generate a usage history of the air conditioning device.

The generating unit may store the generated usage history of the air conditioning device in a database.

The controller may separately control the air conditioning environment near each seat in the vehicle based on the usage history stored in the database.

Based on the extracted location information of the user terminal, the controller may control an air conditioning environment near a seat in which the user terminal is detected based on the user's biometric information and control an air conditioning environment near a seat in which the user terminal is not detected based on default settings.

According to another aspect of the present invention, there is provided a vehicle, including: a communication unit configured to receive a signal from a user terminal; an extracting unit configured to extract location information of the user terminal based on the received signal; and a controller configured to control an air conditioning environment in the vehicle based on a user's biometric information included in the signal and the extracted location information of the user terminal.

The extracting unit may calculate state information based on the received signal and extract the location information of the user terminal by combining direction information and distance information of the user terminal that are obtained based on the calculated state information.

The extracting unit may calculate state information including radiation pattern information of the user terminal and a received signal strength indication based on the received signal.

The extracting unit may obtain the direction information of the user terminal using identification information and radiation pattern information of the user terminal.

The extracting unit may obtain the distance information of the user terminal using the received signal strength indication of the user terminal.

The vehicle may further include an input unit configured to receive a control command related to an air conditioning device from a user in response to control of the air conditioning environment in the vehicle; and a generating unit configured to collect a control command that is related to an air conditioning device and input by the user and generate a usage history of the air conditioning device.

The generating unit may store the generated usage history of the air conditioning device in a database.

The controller may separately control the air conditioning environment near each seat in the vehicle based on the usage history stored in the database.

Based on the extracted location information of the user terminal, the controller may control an air conditioning environment near a seat in which the user terminal is detected based on the user's biometric information and control an air conditioning environment near a seat in which the user terminal is not detected based on default settings.

According to still another aspect of the present invention, there is provided a method of controlling a vehicle, including: receiving a signal from a user terminal; extracting location information of the user terminal based on the received signal; and controlling an air conditioning environment in the vehicle based on a user's biometric information included in the signal and the extracted location information of the user terminal.

The extracting may include calculating state information based on the received signal and extracting the location information of the user terminal by combining direction information and distance information of the user terminal that are obtained based on the calculated state information The extracting may include calculating state information including radiation pattern information of the user terminal and a received signal strength indication based on the received signal.

The extracting may include obtaining the direction information of the user terminal using identification information and the radiation pattern information of the user terminal.

The extracting may include obtaining the distance information of the user terminal using the received signal strength indication of the user terminal.

The method may further include receiving a control command related to an air conditioning device from a user in response to control of the air conditioning environment in the vehicle; and collecting a control command that is related to an air conditioning device and input by the user and generating a usage history of the air conditioning device.

The generating may further include storing the generated usage history of the air conditioning device in a database.

The controlling may include separately controlling the air conditioning environment near each seat in the vehicle based on the usage history stored in the database.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Hereinafter, embodiments of the present invention will be described in detail with reference to the accompanying drawings.

Figure 1:
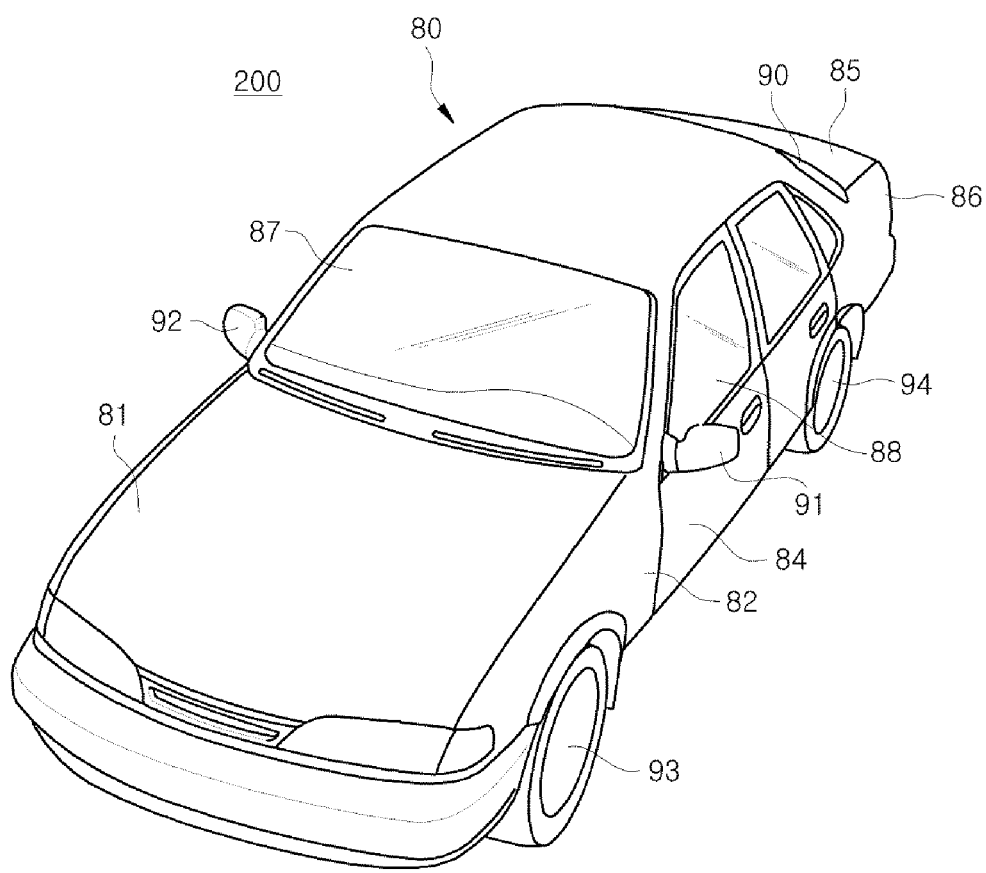
FIG. 1 is a diagram schematically illustrating an external configuration of a vehicle according to an embodiment of the present invention.

FIG. 1 is a diagram schematically illustrating an external configuration of a vehicle according to an embodiment of the present invention.

As illustrated in FIG. 1, a vehicle 200 includes a car body 80 forming an exterior of the vehicle 200 and wheels 93 and 94 moving the vehicle 200. The car body 80 includes a hood 81, a front fender 82, a door 84, a trunk lid 85, a quarter panel 86 and the like.

Also, at an exterior of the car body 80, a front window 87 that is installed in the front of the car body 80 and provides a field of view in front of the vehicle 200, a side window 88 that provides a field of view on sides, side mirrors 91 and 92 that are installed at the doors 84 and provide a field of view behind and beside the vehicle 200, and a rear window 90 that is installed at the rear side of the car body 80 and provides a field of view behind the vehicle 200 may be provided. Hereinafter, an internal configuration of the vehicle 200 will be described in detail.

Figure 2:
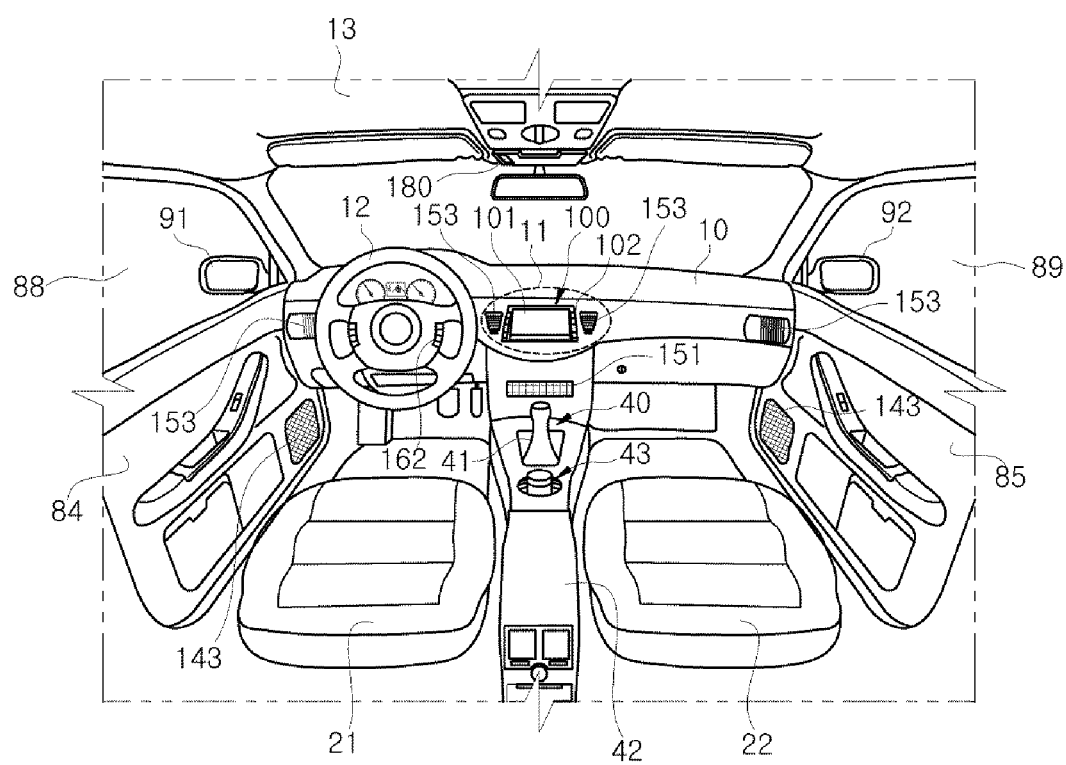
FIG. 2 is a diagram illustrating an internal configuration of a vehicle according to an embodiment of the present invention.

FIG. 2 is a diagram illustrating an internal configuration of a vehicle according to an embodiment of the present invention.

As illustrated in FIG. 2, an audio video navigation (AVN) terminal 100 refers to a device that can perform a navigation function for providing a route to a destination to a user and integrally perform an audio function and a video function.

For example, the AVN terminal 100 may selectively display at least one of an audio screen, a video screen and a navigation screen through a display 101, and may display various control screens related to control of the vehicle 200 or a screen related to an additional function that can be executed in the AVN terminal 100. According to the embodiment, the AVN terminal 100 may display various control screens related to control of the air conditioning device through the display 101 in connection with an air conditioning device. Also, the AVN terminal 100 may control an operation state of the air conditioning device and regulate an air conditioning environment in the vehicle.

The display 101 may be located in a center fascia 11 that is a center area of a dashboard 10. According to the embodiment, the display 101 may be implemented as a liquid crystal display (LCD), a light emitting diode (LED), a plasma display panel (PDP), an organic light emitting diode (OLED), a cathode ray tube (CRT) or the like, but the present invention is not limited thereto.

A speaker 143 capable of outputting a sound may be provided in the vehicle 200. Accordingly, the vehicle 200 may output a sound necessary for performing an audio function, a video function, a navigation function and other additional functions through the speaker 143. According to the embodiment, the AVN terminal 100 may provide information on a temperature in the vehicle 200 and the like, an operation state of the air conditioning device and the like to the user through the speaker 143.

A navigation input unit 102 may be located in the center fascia 11 that is the center area of the dashboard 10. A driver may manipulate the navigation input unit 102 and input various control commands. According to the embodiment, a passenger may manipulate the navigation input unit 102 and input a control command for setting a temperature of the air conditioning device.

Also, the navigation input unit 102 in the form of a hard key may be provided in an area adjacent to the display 101.

Meanwhile, when the display 101 is implemented in the form of a touch screen, the display 101 may also perform a function of the navigation input unit 102.

A center input unit 43 in the form of a jog shuttle or a hard key may be provided in a center console 40. The center console 40 refers to an area that is located between a driver seat 21 and a passenger seat 22 and in which a gear control lever 41 and a tray 42 are formed. The center input unit 43 may perform all or some functions of the navigation input unit 102.

A sound input unit 180 may receive a voice input that is uttered by the driver through a microphone and convert the voice input into an electrical signal. In order to effectively input a voice, the sound input unit 180 may be installed at a headliner 13 as illustrated in FIG. 2, but the embodiment is not limited thereto. The sound input unit 180 may be installed above the dashboard 10 or installed at a steering wheel 12. In addition, the sound input unit 180 may be installed at any location that is appropriate to receive a voice command of the driver who is driving.

That is, the AVN terminal 100 may control various devices embedded in the vehicle 200 according to the user's touch input that is detected through the display 101, the user's voice input that is received through the sound input unit 180 or the user's control command that is received through the navigation input unit 102. Also, the AVN terminal 100 may control various devices embedded in the vehicle 200 according to a control command input by the user through a controller in the form of a jog shuttle or a hard key. In addition, the AVN terminal 100 may be connected to an external device via a communication network. Accordingly, the user may input various control commands through the external device and deliver the commands to the AVN terminal 100.

The vehicle 200 may include the air conditioning device that can perform heating and cooling and control a temperature in the vehicle 200 by discharging heated or cooled air through an air vent 153. The air conditioning device to be described below refers to a device that detects an air conditioning environment including indoor and outdoor environment conditions of the vehicle 200, air intake/exhaust, circulation, cooling/heating states and the like, automatically controls the air conditioning environment in the vehicle 200 based on the detected result or controls the air conditioning environment in the vehicle 200 in response to the user's control command. The air conditioning device is embedded in the vehicle 200 and may separately control the air conditioning environments of the driver seat 21 and the passenger seat 22 in which the passenger sits. In addition to the driver seat 21 and the passenger seat 22, the air conditioning device may also separately control the air conditioning environments of the other seats in the vehicle.

According to the embodiment, the air conditioning device may control an air conditioner, a heating wire of the steering wheel 12, heating and cooling sheets embedded in the driver seat 21 and the passenger seat 22, and operation states of side windows 88 and 89, and separately regulate the air conditioning environments of the driver seat 21 and the passenger seat 22. The device whose operation state can be controlled by the air conditioning device in order to control the air conditioning environment in the vehicle 200 is not limited to the embodiment, but includes various devices that are embedded in the vehicle 200 and can regulate the air conditioning environment.

According to the embodiment, the air conditioning device may correspond to a dual-zone automatic temperature controller (DATC). The DATC refers to a fully automatic temperature control device that automatically sets a temperature and the like of each of the driver seat 21 and the passenger seat 22 or sets a temperature according to the user's control command. The vehicle 200 may use the DATC and separately control the air conditioning environment of each of the driver seat 21 and the passenger seat 22 in which the passenger sits and thus provide convenience for passengers.

For example, depending on a location of the sun, a temperature in the driver seat 21 and a temperature in the passenger seat 22 in which the passenger sits may be different. Therefore, the user sitting on the driver seat 21 may feel hot while the user sitting on the passenger seat 22 does not feel hot. Accordingly, the AVN terminal 100 may separately control temperatures near the driver seat 21 and the passenger seat 22 in which the passenger sits in connection with the air conditioning device, and provide the air conditioning environment appropriate for each of the driver and the passenger.

According to the embodiment, the air conditioning device may discharge air appropriate for each of the users sitting on the driver seat 21 and the passenger seat 22 through the air vent 153, and provide the air conditioning environment appropriate for environments for the users sitting on the driver seat 21 and the passenger seat 22. In addition, the conditioning device may separately control the air conditioning environment of seats in which other passengers sit in addition to the driver seat 21 and the passenger seat 22.

The user's control command related to control of the air conditioning device may be input through an air conditioning input unit 151. Also, the air conditioning device in conjunction with the AVN terminal 100 may control the air conditioning environment in the vehicle 200 according to the user's control command input through the display 101. Also, the air conditioning device in conjunction with the AVN terminal 100 may control the air conditioning environment in the vehicle 200 according to the user's voice command input through the sound input unit 180. In addition, the air conditioning device in conjunction with the AVN terminal 100 may control a temperature in the vehicle 200 according to a control command input through the controller in the form of a jog shuttle or a hard key.

Meanwhile, the air conditioning device in conjunction with the AVN terminal 100 may display a control screen related to the air conditioning device for the driver seat 21 or the passenger seat 22 through the display 101. Hereinafter, an internal configuration of the AVN terminal 100 will be described in detail.

Figure 3:
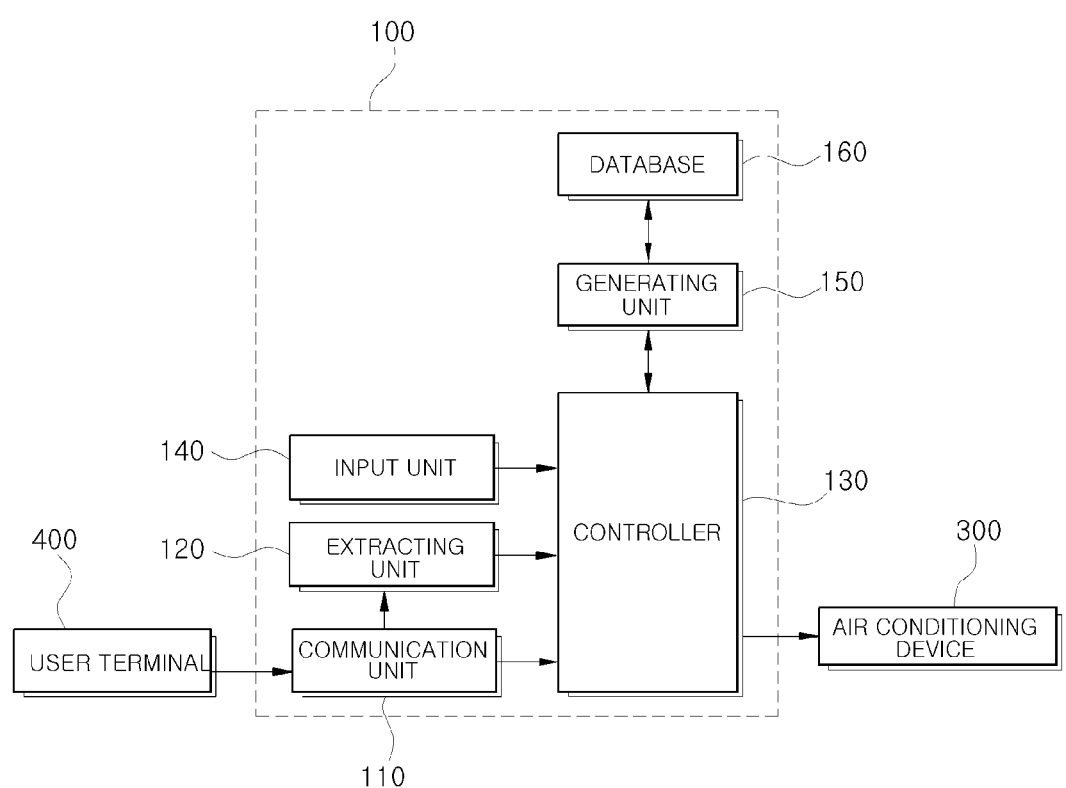
FIG. 3 is a block diagram of an AVN terminal configured to control an air conditioning environment based on a user's biometric information according to an embodiment of the present invention.

FIG. 3 is a block diagram of an AVN terminal configured to control an air conditioning environment based on a user's biometric information according to an embodiment of the present invention.

As illustrated in FIG. 3, the AVN terminal 100 may include a communication unit 110, an extracting unit 120, a controller 130, an input unit 140, a generating unit 150 and a database 160. The communication unit 110, the extracting unit 120, the controller 130, the input unit 140, and the generating unit 150 may be integrated in a system on chip that is embedded in the AVN terminal 100.

A user terminal 400 to be described below refers to a terminal that includes at least one component for enabling communication with the external device and can obtain the user's biometric information through a biometric sensor. For example, the user terminal may include a mobile terminal such as a smartphone and a PDA, a wearable device in the form of a band, a watch, or eyeglasses that can be attached to the user's body, and the like.

The biometric sensor to be described below refers to a sensor that can detect the user's body state such as a body temperature and an amount of sweat of the user. That is, the user terminal 400 may detect a biological state through the biometric sensor and provide the detected result. The biometric sensor may be embedded in the user terminal 400 and be in contact with the user's body to detect the user's body state or provided outside of the user terminal 400 to detect the user's body state.

Meanwhile, the user terminal 400 may include at least one component for enabling communication with the external device. For example, the user terminal 400 may perform wireless communication through at least one of a short distance communication module and a mobile communication module.

The short distance communication module refers to a module for short distance communication within a predetermined distance. For example, techniques for short distance communication may include a wireless LAN, Wi-Fi, Bluetooth, ZigBee, Wi-Fi Direct (WFD), ultra wideband (UWB), Infrared Data Association (IrDA), Bluetooth low energy (BLE), near field communication (NFC) and the like, but the present invention is not limited thereto.

The mobile communication module may transmit and receive a wireless signal to and from at least one of a base station, an external terminal and a server via a mobile communication network. Here, the wireless signal may include a voice call signal, a video telephony call signal or various types of data according to transmission and reception of text/multimedia messages. For example, the user terminal 400 may be connected to the mobile communication network such as 3G and 4G and transmit and receive various types of data to and from the AVN terminal 100 via the base station.

The communication unit 110 may transmit and receive a signal to and from the user terminal 400 via the communication network. According to the embodiment, the communication unit 110 may receive a signal including the user's biometric information from the user terminal 400 via the communication network. Information included in the signal that is received by the communication unit 110 from the user terminal 400 via the communication network is not limited to the embodiment and has no limitation.

The communication unit 110 includes at least one component for enabling communication with the external device and may transmit and receive a signal to and from the external device using the component. For example, the communication unit 110 may transmit and receive a signal to and from the user terminal 400 through at least one of the short distance communication module and the mobile communication module. Since the short distance communication module and the mobile communication module have been described above, detailed descriptions thereof will be omitted.

The extracting unit 120 may extract location information of the user terminal based on state information of the user terminal. Hereinafter, operations of the extracting unit 120 calculating state information from the signal received from the user terminal and extracting location information based on direction information and distance information obtained from the state information will be described step by step.

The extracting unit 120 may extract location information of the user terminal 400 based on the state information of the user terminal 400. The state information to be described below refers to information that is used to recognize a state of the user terminal 400, and more specifically, includes various pieces of information generated when the user terminal 400 and the communication unit 110 are connected via the communication network.

For example, the state information of the user terminal 400 may include identification information of the user terminal 400. As a specific example, the identification information may include a host name, an IP address and the like of the user terminal 400. In addition, the identification information may include various pieces of information that can identify the user terminal 400, but the present invention is not limited thereto.

According to the embodiment, when the extracting unit 120 is connected to a plurality of user terminals 400 in the vehicle via the communication network, the extracting unit 120 may separately identify the plurality of user terminals 400 using the identification information of the user terminal 400 and separately extract location information of the user terminals 400. In particular, when the plurality of user terminals 400 that are the same product are connected via the communication network, the extracting unit 120 may separately identify the plurality of user terminals 400 connected via the communication network using the identification information.

Also, the state information of the user terminal 400 includes radiation pattern information of the user terminal 400, received signal strength indicator (RSSI) information of the signal received from the user terminal 400 and the like, but the present invention is not limited thereto.

The extracting unit 120 may calculate radiation pattern information based on the signal received from the user terminal 400 and obtain direction information of the user terminal 400 using the calculated information. The radiation pattern information refers to radiation power output from an antenna of the user terminal 400 that is expressed as a function of direction. That is, when a signal is transmitted and received between the user terminal 400 and the communication unit 110 via the communication network, the extracting unit 120 may calculate radiation pattern information output from the antenna of the user terminal 400 to the AVN terminal 100.

For example, when the user terminal 400 delivers a signal that includes the user's biometric information, the extracting unit 120 may obtain radiation pattern information according to radiation power output from the antenna of the user terminal 400 to the AVN terminal 100. As another example, in order to connect the user terminal 400 and the communication unit 110 via a wireless LAN, the user terminal 400 may transmit a connection request signal to the communication unit 110. In response thereto, the communication unit 110 may transmit a response signal to the user terminal 400 and thus the user terminal 400 and the communication unit 110 may be connected. In this case, when the user terminal 400 transmits the connection request signal, the extracting unit 120 may calculate radiation pattern information output from the antenna of the user terminal 400 to the AVN terminal 100.

Accordingly, when the extracting unit 120 obtains direction information of the user terminal 400 based on the radiation pattern information, it is possible to determine a current location of the user who possesses the user terminal 400. According to the embodiment, when the front window is seen from the inside of the vehicle, seats in the vehicle may be classified as a left seat and a right seat. The extracting unit 120 may determine whether the user is sitting on the left seat or the right seat based on the direction information of the user terminal 400.

Meanwhile, the extracting unit 120 may calculate a received signal strength indication of the signal received from the user terminal 400 and obtain distance information of the user terminal 400 using the calculated information. For example, a strength of the signal received from the user terminal 400 may be inversely proportional to a distance between the user terminal 400 and the AVN terminal 100. As a specific example, as the distance between the user terminal 400 and the AVN terminal 100 increases, a strength of the signal to be received may decrease. As another example, as the distance between the user terminal 400 and the AVN terminal 100 decreases, a strength of the signal to be received may increase.

Accordingly, the extracting unit 120 may recognize whether the user is sitting on a front seat in which the driver seat or the passenger seat is located or is sitting on a rear seat using the received signal strength indication. The received signal used for calculating the received signal strength indication has no limitation. For example, the extracting unit 120 may calculate the received signal strength indication using the received signal that includes the user's biometric information, but may calculate the received signal strength indication from another signal received from the user terminal 400.

Meanwhile, even when distances between the plurality of user terminals 400 and the AVN terminal 100 are the same, a strength of the received signal may be changed according to characteristic information of each of the plurality of user terminals 400. The characteristic information of the user terminal 400 to be described below includes information on the strength of the received signal according to the distance of the user terminal 400. According to a product of the user terminal 400, a strength of the signal may be the same or changed. Therefore, the extracting unit 120 may obtain distance information of the user terminal 400 according to a strength of the received signal based on characteristic information of the user terminal 400 that is stored in a memory. Accordingly, when the extracting unit 120 is connected to any type of the user terminal 400, it is possible to determine whether a location of the user terminal 400 is the front seat or the rear seat in consideration of each characteristic.

Accordingly, the extracting unit 120 may combine distance information with direction information and extract location information of the user terminal 400. That is, when the extracting unit 120 may combine distance information with direction information and extract location information, it is possible to determine a current location of the user who possesses the user terminal 400 in the vehicle.

The controller 130 may control the air conditioning environment in the vehicle in connection with the air conditioning device based on the user's biometric information and location information of the user terminal. The controller 130 may separately control the air conditioning environment in connection with the air conditioning device based on biometric information of the user who is sitting on each seat in the vehicle. For example, a body temperature of a first user sitting on the driver seat may be higher than an average due to sunlight and a body temperature of a second user sitting on the passenger seat may be lower than the average. Also, a body temperature of a third user sitting on a seat behind the driver seat may be higher than the average and a body temperature of a fourth user sitting on a seat behind the passenger seat may be lower than the average.

In connection with the air conditioning device, the controller 130 may discharge cooled air through an air vent located near the first user and the third user and discharge heated air through an air vent located near the second user and the fourth user. In addition, the controller 130 may control operation states of various devices that are embedded in the vehicle and can regulate the air conditioning environment and provide the air conditioning environment appropriate for each user. That is, the controller 130 may receive the users' biometric information that is constantly changing, manipulate the air conditioning device, and thus separately control the air conditioning environment for the users in the vehicle. Accordingly, the controller 130 may provide the customized air conditioning environment for each of the users in the vehicle.

Meanwhile, based on location information of the user terminal 400, the controller 130 may control the air conditioning environment near the seat in which the user terminal 400 is detected based on the user's biometric information, and may control the air conditioning environment near the seat in which the user terminal 400 is not detected according to default settings. For example, when it is detected that the user terminal 400 is located near the driver seat based on location information of the user terminal 400, the controller 130 may control the air conditioning environment near the driver seat based on the user's biometric information and control the air conditioning environment near seats other than the driver seat based on default settings. The default settings may be preset by the user or a designer. For example, in a memory of the AVN terminal 100, the air conditioning environment such as a temperature based on an external temperature and an internal temperature and wind force may be stored as default settings. Accordingly, the controller 130 may control the air conditioning environment near the seat in which the user terminal 400 is not detected based on default settings. Meanwhile, the input unit 140 may receive a control command related to an air conditioning device 300 from the user. For example, referring to description of FIG. 1, the input unit 140 may receive a control command related to the air conditioning device 300 from the user through the display 101 implemented in the form of a touch screen, the sound input unit 180, the navigation input unit 102, or the controller in the form of a jog shuttle or a hard key.

In addition, the input unit 140 may receive the control command related to the air conditioning device 300 from the user terminal 400 that is connected to the AVN terminal 100 via a wireless communication network or a wired communication network. That is, the input unit 140 may receive the control command related to the air conditioning device from various controllers that are embedded in the vehicle or various terminals that are connected to the AVN terminal 100.

According to the embodiment, in response to control of the air conditioning environment in connection with the air conditioning device 300 by the controller 130, the user may input the control command related to the air conditioning device 300 through the input unit 140 according to the user's tendency and preference, and separately control the air conditioning device 300 again. For example, when the controller 13 manipulates the air conditioning device 300 and regulates a temperature of the air conditioner disposed near the driver seat to 24° C., the user may regulate a temperature of the air conditioner to 19° C. according to his or her preference.

The generating unit 150 may collect the control command related to the air conditioning device 300 that is input by the user. For example, the generating unit 150 may collect the user's control command related to the air conditioning device 300 as a log file and store the command in the database 160. In addition, the generating unit 150 may collect the control command input by the user through various forms of formats.

The generating unit 150 may generate the user's usage history of the air conditioning device 300 based on the collected control command. For example, the generating unit 150 includes a usage history of the air conditioning device 300 that is controlled by the user, that is, information about how the user regulates the air conditioning device 300 in response to control of the air conditioning device by the controller 130 when the user is in a specific body condition.

The user's usage history of the air conditioning device may be different according to a time of day or month. Accordingly, the generating unit 150 may analyze the control command related to the air conditioning device according to a time of day or month and generate a usage history according to a time of day or month.

For example, even when the user has the same body temperature, since an intensity of sunlight differs over time of day, the user who has boarded in the daytime may feel warmer than the user who has boarded at night. Also, when the user has the same body temperature, since a temperature of the outside is different, the user who has boarded the vehicle in August avoids lowering the side window, but the user who has boarded the vehicle in April may prefer to lower the side window to feel a cool breeze.

The controller 130 may actively control the air conditioning device 300 based on the usage history stored in the database 160. That is, when the controller 130 recognizes the user's tendency more accurately using the usage history, it is possible to provide the air conditioning environment appropriate for the user.

The database 160 may be implemented as a memory that is embedded in the AVN terminal 100. The memory may be implemented as a random access memory (RAM), a read only memory (ROM) and the like and may also be implemented as a memory card in the form of a card that is insertable into the AVN terminal 100 such as a secure digital (SD) card and a solid state drive (SSD) card. However, the memory is not limited to the embodiment, but may be implemented as various types of memories that are insertable into or are embedded into the AVN terminal 100 or can store various pieces of data.

The database 160 may store various pieces of data. For example, the database 160 may store the control command related to the air conditioning device 300 that is input by the user. Also, the database 160 may store the usage history of the air conditioning device 300. The usage history of the air conditioning device 300 may be classified for each user and stored in the database 160. That is, even when users are in the same state, a desired air conditioning environment may be different depending on the user's tendency or constitution. Accordingly, the database 160 may classify and store the usage history of the air conditioning device for each user. The database 160 may classify and store the usage history of the air conditioning device based on identification information received from the user terminal 400.

Also, the usage history of the air conditioning device may be classified and stored according to a time of day or month. Even when the user is in the same state, the air conditioning environment desired by the user may be different according to a time of day or month. Accordingly, the database 160 may store the usage history of the air conditioning device according to a time of day or month based on the same user.

In addition, the database 160 may store characteristic information of various types of the user terminal 400. According to a product of the user terminal 400, a strength of the signal may be changed. Therefore, the database 160 may store characteristic information of the user terminal 400. When any type of the user terminal 400 is connected to the AVN terminal 100, distance information may be identified.

Characteristic information of the user terminal 400 may be directly received from the user terminal 400 or updated in the database 160. Alternatively, the user terminal 400 is connected to the Internet via the communication network, and the information may be received from a web server and the like and updated in the database 160.

According to the embodiment, when the user terminal 400 and the vehicle are initially connected, the communication unit 110 receives characteristic information such as RSSI specification information of the user terminal 400 from the user terminal 400 via the communication network and thus the database 160 may be updated.

As still another example, according to a preset period or in response to the user's request, the communication unit 110 is connected to a web server through modem communication in the vehicle, base station access or the like is connected to the web server through tethering of the user terminal 400, and characteristic information of the user terminal 400 may be updated. The update period may be preset by the user or the designer. In addition, the database 160 may update characteristic information of the user terminal 400 using various methods without limitation.

Figure 4:
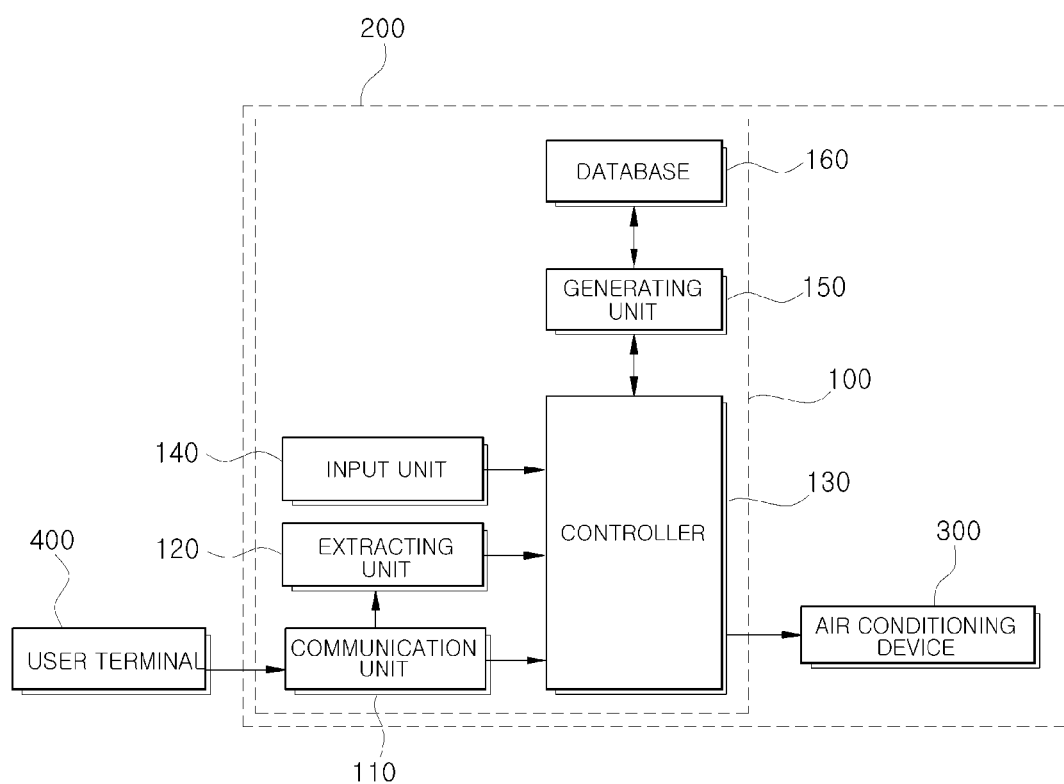
FIG. 4 is a block diagram of a vehicle including an AVN terminal and an air conditioning device according to an embodiment of the present invention.

As illustrated in FIG. 4, the vehicle 200 may include the AVN terminal 100 that has the communication unit 110, the extracting unit 120, the controller 130, the input unit 140, the generating unit 150 and the database 160, and the air conditioning device 300.

Various pieces of data may be transmitted and received between the AVN terminal 100 and the air conditioning device 300 in the vehicle 200 via a network in the vehicle 200. According to the embodiment, the network in the vehicle 200 may correspond to a controller area network (CAN).

The controller area network to be described below is a vehicle network for providing digital serial communication among various control devices of the vehicle 200 and refers to a communication network for real time communication by replacing complex electrical wires and relays of electronic components in the vehicle 200 with a serial communication line. However, the network is not limited to the embodiment. Various pieces of data may be transmitted and received between the AVN terminal 100 and the air conditioning device 300 via various networks available in the vehicle 200.

Since the communication unit 110, the extracting unit 120, the controller 130, the input unit 140, the generating unit 150, and the database 160 have been described above, redundant descriptions thereof will be omitted.

Figure 5:
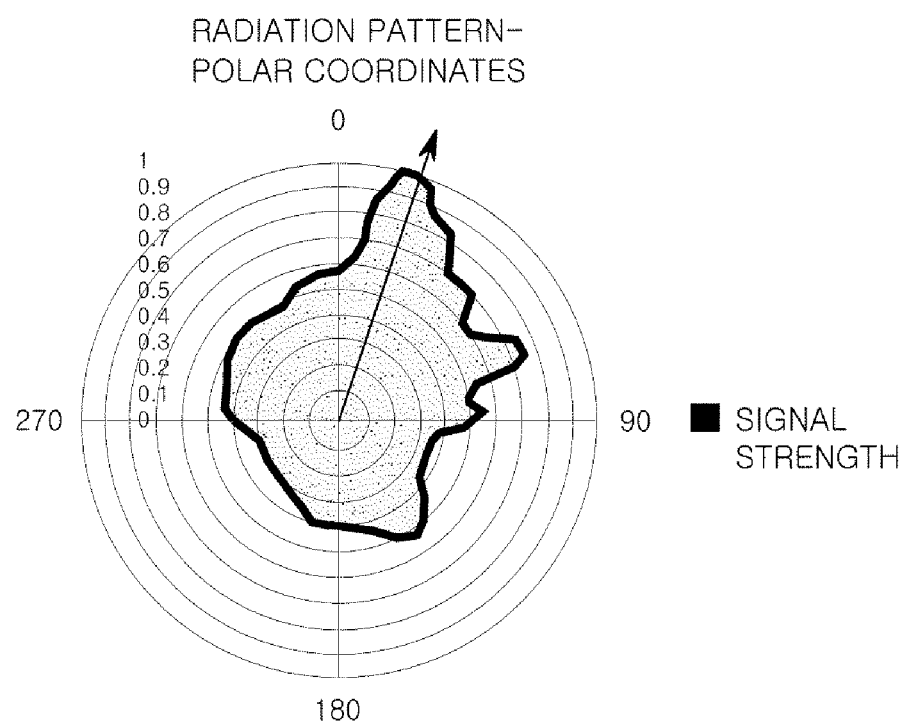
FIG. 5 is a diagram illustrating a radiation pattern output from a user terminal according to an embodiment of the present invention.

FIG. 5 is a diagram illustrating a radiation pattern output from a user terminal according to an embodiment of the present invention.

The user terminal may transmit and receive data to and from the AVN terminal via the wireless communication network. In this case, the user terminal may transmit and receive a signal in which data is included to and from the AVN terminal in a radio frequency band used for wireless communication using the antenna.

FIG. 5 is a diagram that illustrates a radiation pattern radiated from the antenna of the user terminal when the user terminal transmits and receives a signal via the communication network. Specifically, the radiation power is power output when the antenna radiates a signal. The radiation pattern is the radiation power from the antenna of the user terminal generated when a signal is transmitted and received between the user terminal and the AVN terminal, which is expressed as a function of direction.

The AVN terminal may determine a direction in which the user terminal is located using radiation pattern information. As illustrated in FIG. 5, a strength of a signal in a direction in which a signal is transmitted and received between the user terminal and the AVN terminal may be high. In FIG. 5, the user terminal 400 is located at the center of the radiation pattern and the AVN terminal 100 is located in a direction in which a strength of the signal is the highest in the radiation pattern.

According to the embodiment, when the rear window is seen from the inside of the vehicle, the AVN terminal may determine that the user terminal is located at 1 o'clock through radiation pattern information. Accordingly, the AVN terminal may determine that the user terminal is located in the driver seat or a seat behind the driver seat.

Therefore, the AVN terminal may determine whether the user terminal is located in the driver seat or the seat behind the driver seat using a strength of the received signal. A strength of the signal may be inversely proportional to the distance. Therefore, the AVN terminal may determine location information of the user terminal based on the strength of the received signal, that is, RSSI.

However, since types of the user terminals are different, the strength of the signal may be the same or changed according to a characteristic of the user terminal. The AVN terminal may store in advance a range of the RSSI according to the characteristic of the user terminal. Accordingly, even when signals are received from different types of user terminals, the AVN terminal may determine location information of the user terminal using the pre-stored information.

When a new type of the user terminal is released, the AVN terminal may update characteristic information of the new type of the user terminal. For the update, updating may be automatically performed according to a preset period or the user may manually update. The preset period may be set by the user or the designer.

Figure 6:
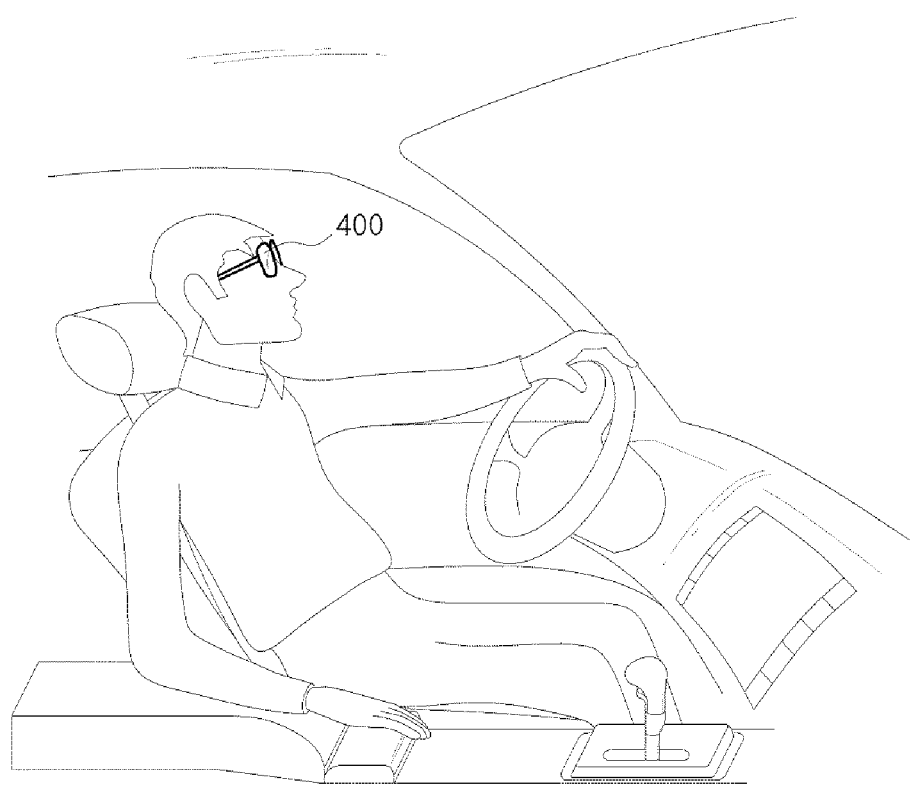
FIG. 6 is a diagram illustrating a case in which a user wears a user terminal implemented in the form of eyeglasses in a vehicle according to an embodiment of the present invention.

FIG. 6 is a diagram illustrating a case in which a user wears a user terminal implemented in the form of eyeglasses in a vehicle according to an embodiment of the present invention.

The user terminal to be described below refers to a terminal that includes at least one component for enabling communication with the external device and may obtain the user's biometric information through the embedded biometric sensor. For example, the user terminal may include a mobile terminal such as a smartphone and a PDA. The user terminal may obtain the user's biometric information through the embedded biometric sensor and deliver the obtained biometric information to the vehicle.

Figure 7:
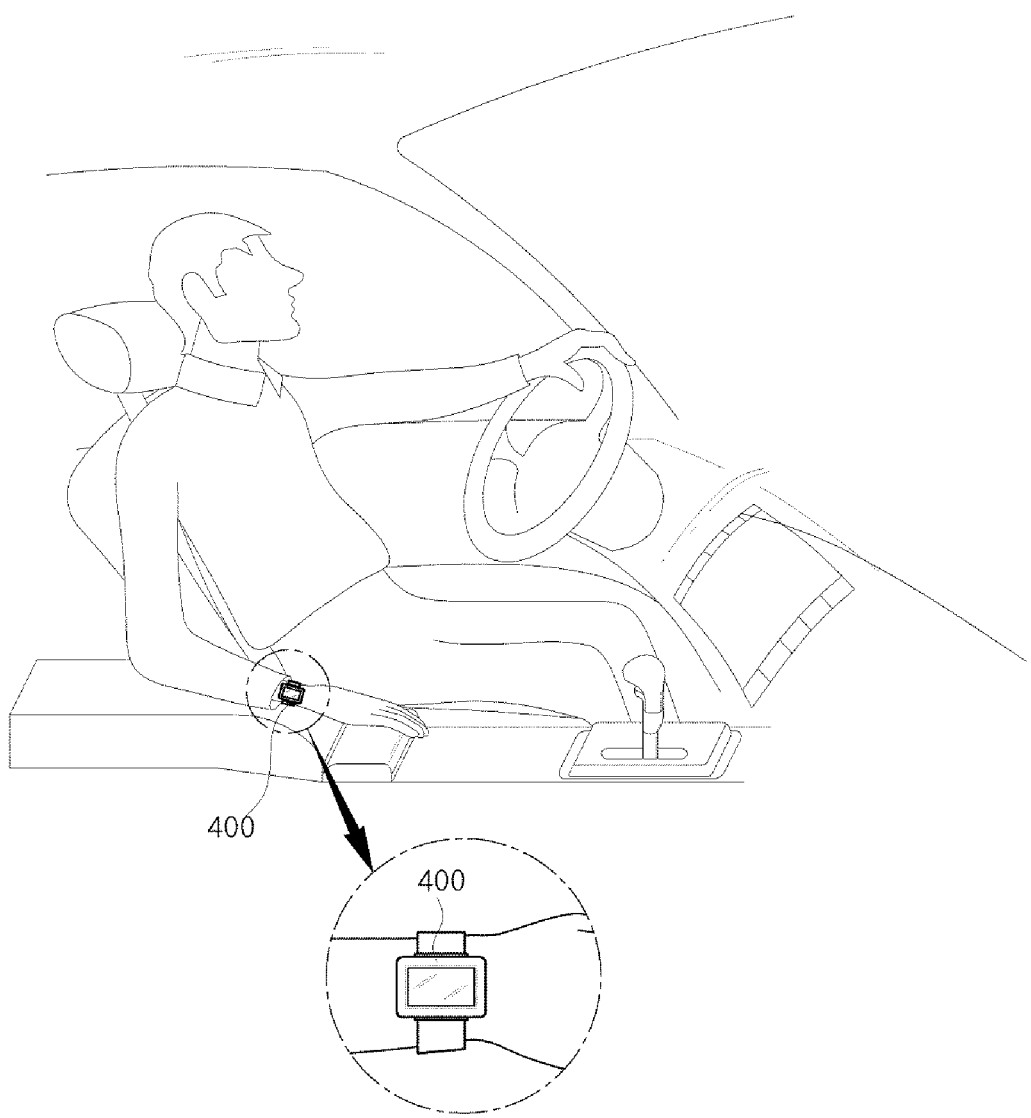
FIG. 7 is a diagram illustrating a case in which a user wears a user terminal implemented in the form of a watch in a vehicle according to an embodiment of the present invention.
Figure 8:
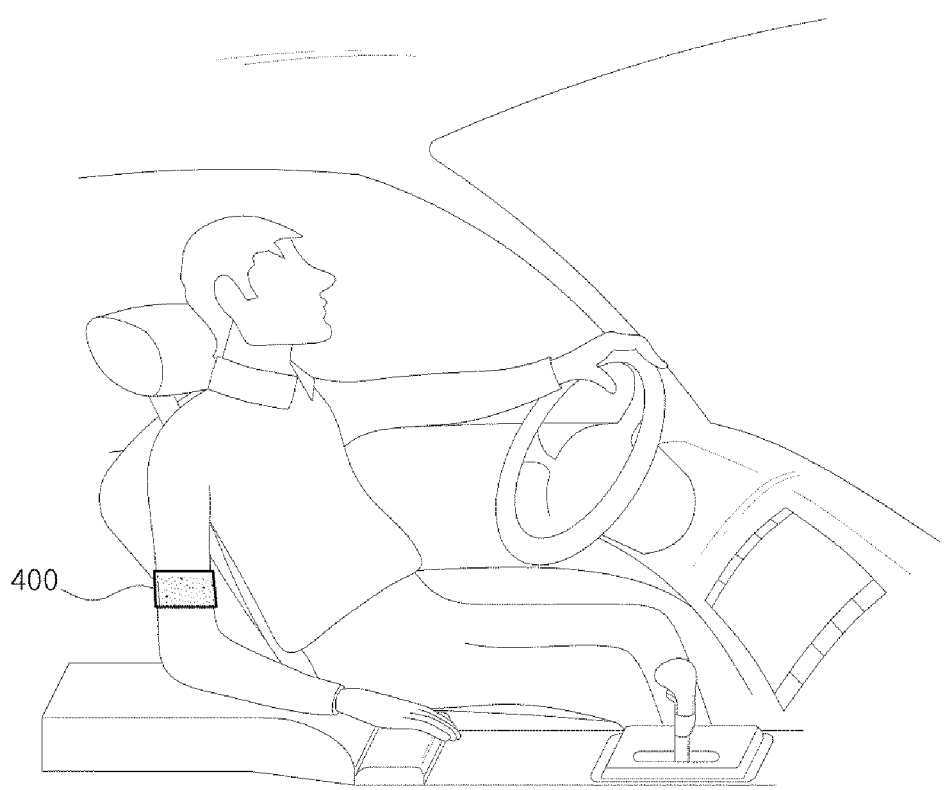
FIG. 8 is a diagram illustrating a case in which a user wears a user terminal implemented in the form of a band in a vehicle according to an embodiment of the present invention.

In addition, the user terminal may include a wearable device in the form of a band, a watch, or eyeglasses that can be attached to the user's body, and the like. As illustrated in FIG. 6, the user terminal 400 may be implemented in the form of eyeglasses and be attached near the face of the user's body. In addition, as illustrated in FIG. 7, the user terminal 400 may be implemented in the form of a watch and attached near a wrist of the user's body. Also, as illustrated in FIG. 8, the user terminal 400 may be implemented in the form of a band and attached near an arm of the user's body.

Figure 9:
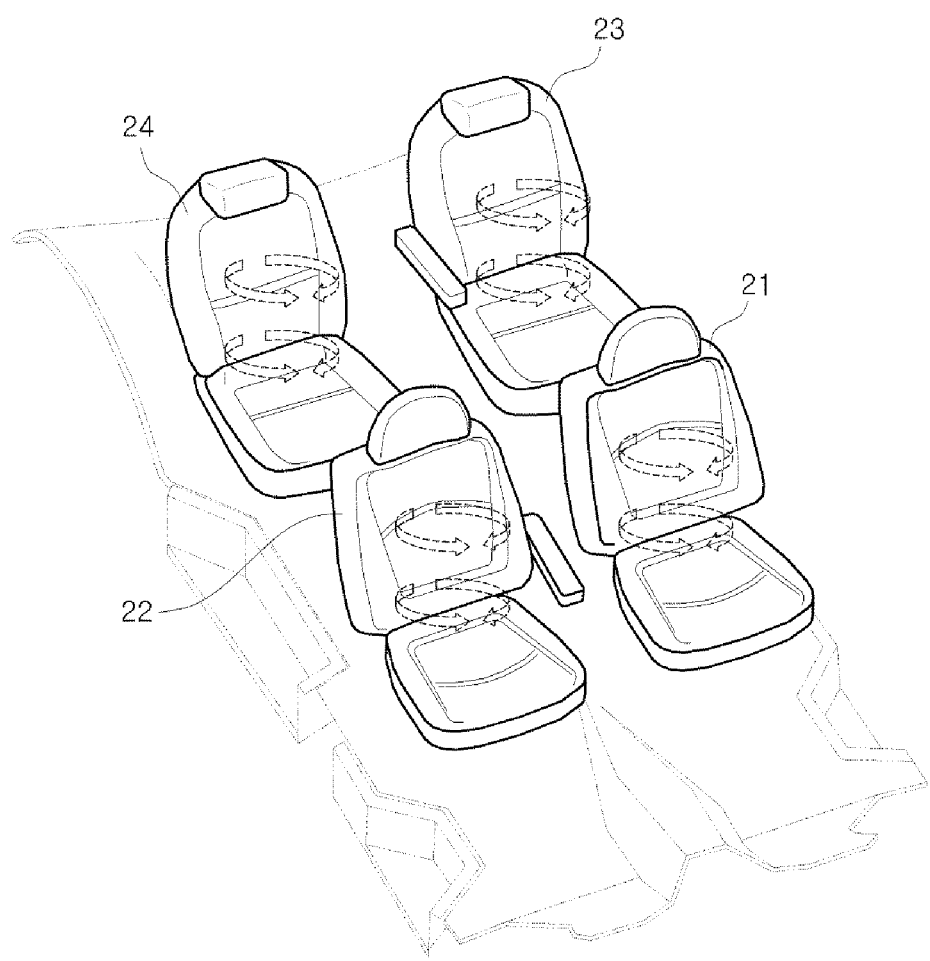
FIG. 9 is a diagram illustrating a view in which an air conditioning environment is separately controlled for each seat in a vehicle.

FIG. 9 is a diagram illustrating a view in which an air conditioning environment is separately controlled for each seat in a vehicle.

The AVN terminal may separately control the air conditioning environment near each seat of the vehicle by manipulating the air conditioning device. As illustrated in FIG. 9, seats in the vehicle may be classified as the front seat or the rear seat with respect to the front window. In this case, the front seat includes the driver seat 21 and the passenger seat 22. The rear seat includes a first seat 23 located behind the driver seat 21 and a second seat 24 located behind the passenger seat 22.

The air conditioning device may control the air conditioning environment in the vehicle by separately manipulating the air conditioner, the heating wire of the steering wheel, heating and cooling sheets embedded in the driver seat 21 and the passenger seat 22 and the side window. According to the embodiment, the air conditioning device may correspond to the DATC. The DATC may separately control the air conditioning environment of the driver seat 21, the passenger seat 22, the first seat 23 and the second seat 24.

For example, the users may sit on the driver seat 21, the passenger seat 22, and the second seat 24 in the vehicle. In this case, the user sitting on the driver seat 21 may sweat, and the users sitting on the passenger seat 22 and the second seat 24 may maintain an average temperature.

Accordingly, the AVN terminal may lower the side window located near the seat 21 of the driver who is currently sweating profusely and simultaneously discharge cooled air through an air vent located near the driver seat 21 in conjunction with the air conditioning device. Also, the AVN terminal may keep the side windows located near the passenger seat 22 and the second seat 24 closed, and at the same time, no air may be discharged through an air vent located near the passenger seat 22 and the second seat 24.

That is, the AVN terminal may separately determine biometric information of the user located in each seat, and provide the air conditioning environment appropriate for the user's biological state based on the determined result. That is, the AVN terminal may provide the air conditioning environment appropriate for all users who have boarded the vehicle, and thus convenience may be further improved.

Figure 10:
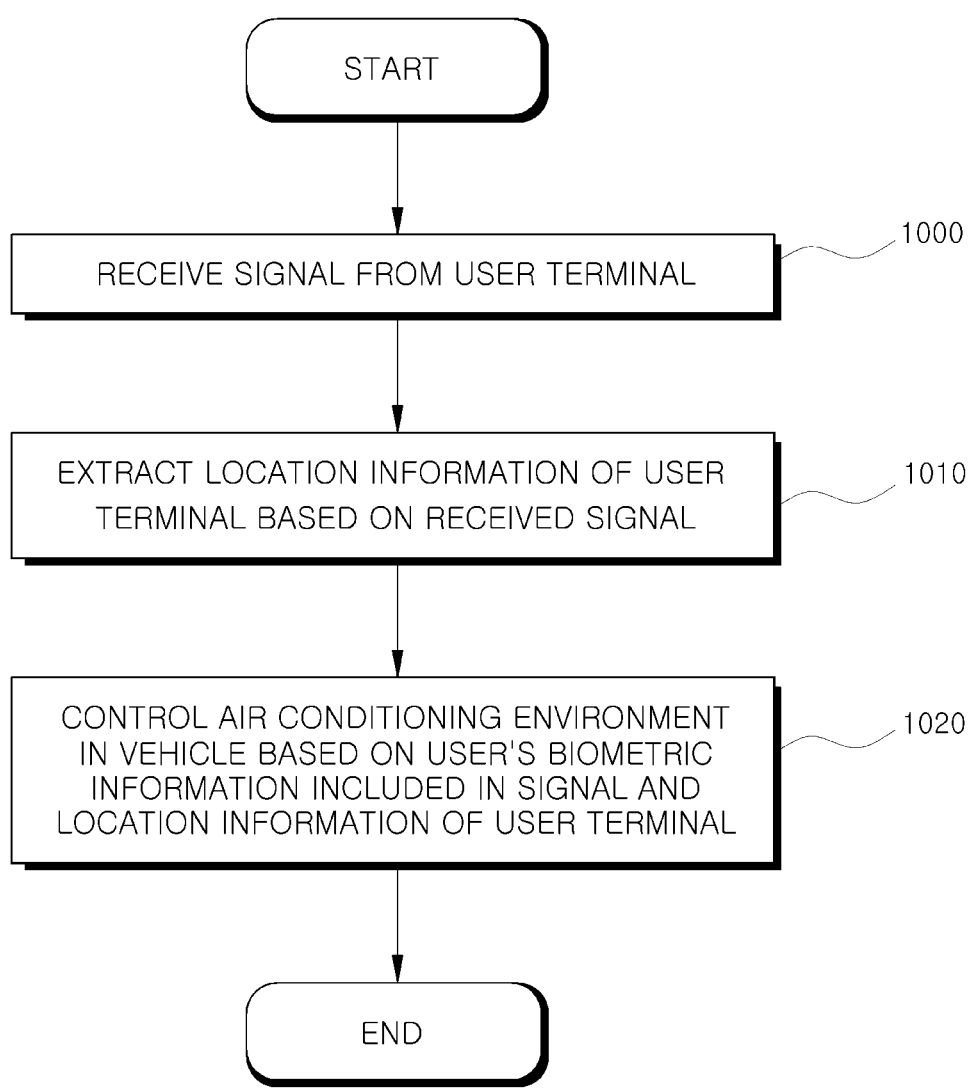
FIG. 10 is an operation flowchart illustrating a method of controlling a vehicle in which an air conditioning environment is controlled based on a user's biometric information according to an embodiment of the present invention.

FIG. 10 is an operation flowchart illustrating a method of controlling a vehicle in which an air conditioning environment is controlled based on a user's biometric information according to an embodiment of the present invention.

In operation 1000, the vehicle may receive a signal including various pieces of information from the user terminal via the communication network. The vehicle may transmit and receive a signal to and from the user terminal using the short distance communication module, the mobile communication module and the like which enable communication with the external device.

As a specific example, the vehicle may receive a signal including the user's biometric information via the communication network. The user's biometric information refers to information on the user's body state that is detected by the biometric sensor embedded in the user terminal. The vehicle may accurately determine the user's biological state through the user's biometric information and provide the air conditioning environment appropriate for the state. The vehicle may receive the user's biometric information according to a preset period. The preset period may be set by the user or the designer. The vehicle may continuously receive the user's biometric information and actively control the air conditioning environment appropriate for the user's biometric information. Also, the vehicle may receive the user's biometric information only when there is a request from the user.

In operation 1010, the vehicle may extract location information of the user terminal based on state information of the user terminal. The state information of the user terminal refers to information on the state of the user terminal that receives a signal from the vehicle via the communication network. For example, the state information of the user terminal includes at least one of radiation pattern information, the received signal strength indication, and identification information of the user terminal.

The user terminal may obtain distance information and direction information using the state information and extract location information by combining these pieces of information. As a specific example, the location information of the user terminal may be obtained by combining distance information between the user terminal and the AVN terminal in the vehicle with direction information between the user terminal and the AVN terminal.

The distance information between the user terminal and the AVN terminal may be obtained based on the strength of the signal received from the user terminal. The AVN terminal may calculate the strength of the signal received from the user terminal and obtain distance information based on the calculated result.

Meanwhile, the direction information between the user terminal and the AVN terminal may be obtained based on radiation pattern information of the radiation power of the user terminal. Also, when there are a plurality of user terminals in the vehicle, the vehicle may obtain each piece of direction information by identifying each of the plurality of user terminals using identification information of the user terminal. The vehicle may obtain distance information and direction information using the state information of the user terminal and extract location information by combining the obtained results.

In operation 1020, the vehicle may provide the air conditioning environment appropriate for each user who is sitting on each seat in the vehicle using the user's biometric information and the location information of the user terminal. The vehicle may control the side window, the ventilation seat, a heating wire of the steering wheel and the like using the air conditioning device and thus provide the air conditioning environment appropriate for the user in each seat. Accordingly, the vehicle may provide a more comfortable environment to passengers.

There are provided the AVN terminal for providing convenience of passengers by separately controlling the air conditioning environment near seats in the vehicle, the vehicle having the same, and the method of controlling a vehicle.

The method according to the embodiment may be implemented in the form of program instructions that can be performed through various computer units and recorded in computer readable media. The computer readable media may include a program instruction, a data file, a data structure, or combinations thereof. The program instruction recorded in the computer readable media may be specially designed and prepared for the embodiments of the invention or may be an available well-known instruction for those skilled in the field of computer software. Examples of the computer readable media include magnetic media such as a hard disk, a floppy disk, and a magnetic tape, optical media such as a CD-ROM and a DVD, magneto-optical media such as a floptical disk, and a hardware device, such as a ROM, a RAM, or a flash memory, that is specially made to store and perform the program instruction.

Examples of the program instruction include a machine code generated by a compiler and a high-level language code that can be executed in a computer using an interpreter and the like. The hardware device may be configured as at least one software module in order to perform operations of embodiments of the present invention and vice versa.

As described above, while the embodiments have been described with reference to specific embodiments and drawings, various modifications and alternations may be made by those skilled in the art from the above description. For example, when the described technologies are performed in the order different from the described methods, and/or the described components such as a system, a structure, a device and a circuit are coupled or combined in the form different from the described method, or replaced or substituted with other components or equivalents, the appropriate result may be achieved.

Therefore, other implementations, other embodiments and equivalents within the scope of the appended claims are included in the range of the claims to be described.

What is claimed is:

1. An audio video navigation (AVN) terminal, comprising:
   a communicator includes at least one component for enabling communication with an external device and configured to receive a signal from a biometric sensor of a user terminal via a communication network;
   an extractor configured to extract location information of the user terminal based on the received signal from the user terminal via the communication network; and
   a controller configured to control an air conditioning environment in the vehicle based on a user's biometric information and the extracted location information of the user terminal included in the received signal from the user terminal via the communication network.

2. The AVN terminal according to claim 1, wherein the extractor calculates state information based on the received signal and extracts the location information of the user terminal by combining direction information and distance information of the user terminal that are obtained based on the calculated state information.

3. The AVN terminal according to claim 2, wherein the extractor calculates state information that includes radiation pattern information of the user terminal and a received signal strength indication based on the received signal.

4. The AVN terminal according to claim 3, wherein the extractor obtains the direction information of the user terminal using identification information and the radiation pattern information of the user terminal.

5. The AVN terminal according to claim 3, wherein the extractor obtains the distance information of the user terminal using the received signal strength indication of the user terminal.

6. The AVN terminal according to claim 1, further comprising:
   an input configured to receive a control command related to an air conditioning device from a user in response to control of the air conditioning environment in the vehicle; and
   a generator configured to collect a control command that is related to an air conditioning device and input by the user and generate a usage history of the air conditioning device.

7. The AVN terminal according to claim 6, wherein the extractor stores the generated usage history of the air conditioning device in a database.

8. The AVN terminal according to claim 7, wherein the controller separately controls the air conditioning environment near a seat in the vehicle based on the usage history stored in the database.

9. The AVN terminal according to claim 1, wherein: based on the extracted location information of the user terminal, the controller controls an air conditioning environment near a seat in which the user terminal is detected based on the user's biometric information and controls an air conditioning environment near a seat in which the user terminal is not detected based on default settings.

10. A vehicle, comprising:
- a communicator includes at least one component for enabling communication with an external device and configured to receive a signal from a biometric sensor of a user terminal via a communication network;
- an extractor configured to extract location information of the user terminal based on the received signal from the user terminal via the communication network; and
- a controller configured to control an air conditioning environment in the vehicle based on a user's biometric information and the extracted location information of the user terminal included in the received signal from the user terminal via the communication network.

11. The vehicle according to claim 10, wherein the extractor calculates state information based on the received signal and extracts the location information of the user terminal by combining direction information and distance information of the user terminal that are obtained based on the calculated state information.

12. The vehicle according to claim 11, wherein the extractor calculates state information that includes radiation pattern information of the user terminal and a received signal strength indication based on the received signal.

13. The vehicle according to claim 12, wherein the extractor obtains the direction information of the user terminal using identification information and the radiation pattern information of the user terminal.

14. The vehicle according to claim 12, wherein the extractor obtains the distance information of the user terminal using the received signal strength indication of the user terminal.

15. The vehicle according to claim 10, further comprising:
- an input configured to receive a control command related to an air conditioning device from a user in response to control of the air conditioning environment in the vehicle; and
- a generator configured to collect a control command that is related to an air conditioning device and input by the user and generate a usage history of the air conditioning device.

16. The vehicle according to claim 15, wherein the generator stores the generated usage history of the air conditioning device in a database.

17. The vehicle according to claim 16, wherein the controller separately controls the air conditioning environment near each seat in the vehicle based on the usage history stored in the database.

18. The vehicle according to claim 10, wherein: based on the extracted location information of the user terminal, the controller controls an air conditioning environment near a seat in which the user terminal is detected based on the user's biometric information and controls an air conditioning environment near a seat in which the user terminal is not detected based on default settings.

19. A method of controlling a vehicle, comprising:
- receiving a signal from a biometric sensor of a user terminal via a communication network;
- extracting location information of the user terminal based on the received signal from the user terminal via the communication network; and
- controlling an air conditioning environment in the vehicle based on a user's biometric information and the extracted location information of the user terminal included in the received signal from the user terminal via the communication network.

20. The method according to claim 19, wherein the extracting includes calculating state information based on the received signal and extracting the location information of the user terminal by combining direction information and distance information of the user terminal that are obtained based on the calculated state information.

21. The method according to claim 19, wherein the extracting includes calculating state information including radiation pattern information of the user terminal and a received signal strength indication based on the received signal.

22. The method according to claim 21, wherein the extracting includes obtaining direction information of the user terminal using identification information and the radiation pattern information of the user terminal.

23. The method according to claim 22, wherein the extracting includes obtaining distance information of the user terminal using the received signal strength indication of the user terminal.

24. The method according to claim 19, further comprising:
- receiving a control command related to an air conditioning device from a user in response to control of the air conditioning environment in the vehicle; and
- collecting a control command that is related to an air conditioning device and input by the user and generating a usage history of the air conditioning device.

25. The method according to claim 24, wherein the generating further includes storing the generated usage history of the air conditioning device in a database.

26. The method according to claim 25, wherein the controlling includes separately controlling the air conditioning environment near each seat in the vehicle based on the usage history stored in the database.

* * * * *